UNITED STATES PATENT OFFICE.

WILLIS A. GIBBONS, OF FLUSHING, NEW YORK, ASSIGNOR TO THE INDIA RUBBER COMPANY, A CORPORATION OF NEW JERSEY.

PROCESS FOR PRODUCING PIGMENTED RUBBERS AND PRODUCTS OBTAINED THEREBY.

1,259,508. Specification of Letters Patent. Patented Mar. 19, 1918.

No Drawing. Application filed December 9, 1916. Serial No. 135,987.

*To all whom it may concern:*

Be it known that I, WILLIS A. GIBBONS, a citizen of the United States, residing at Flushing, L. I., county of Queens, State of New York, have invented certain new and useful Improvements in Processes for Producing Pigmented Rubbers and Products Obtained Thereby, of which the following is a full, clear, and exact description.

This invention relates to processes for producing pigmented rubbers and to the products obtained thereby. It is more particularly directed to a process for producing a rubber material in which the pigment is superficially affixed; and to such superficially pigmented rubber.

One of the objects of the invention is to provide a simple and efficient process of the kind mentioned in which the ratio of pigment used to the surface covered shall be relatively small compared with that in other heretofore known pigmenting processes. Another object is to devise a process by which pigments ordinarily injured by sulfur and other vulcanizing ingredients may be incorporated in the rubber without injury by such substances. Another object of the invention is to produce a superficially pigmented rubber which shall present a lustrous and generally ornamental surface and whose surface also shall offer little resistance to the passage of the material through air or water when used for example as wing-, boat- or pontoon-material for aeroplane structures. Another object is to provide a product whose light reflecting qualities shall be such that it will be generally difficult to detect and may at long distances become practically invisible. Another object of the invention is to provide a product which while having the appearance of heavily pigmented rubber shall have a relatively much greater tensile strength than similarly appearing pigmented rubbers as heretofore made.

In carrying out the preferred process for the manufacture of the preferred material a sheet of unvulcanized rubber stock containing sulfur or other vulcanizing ingredient is first prepared in any desired manner. The sheet may be of hard or soft rubber and fabric may or may not be incorporated therewith. To the surface of this unvulcanized sheet a pigment layer is applied, preferably aluminum powder, where the material is to be employed for aeroplane construction. The application of this powder may be made in any desired manner. It may be mixed with a rubber solution, the consistency of which may be varied in accordance with the method of application to the sheet, the rubber solution and aluminum powder mixture being preferably applied by a spreading machine or by calendering. I prefer, however, to apply the aluminum powder in its dry comminuted form by dusting or otherwise spreading it over the surface of the unvulcanized sheet. Upon the pigment layer so formed a layer of metal-foil, preferably tin-foil, is then placed, and the so-assembled material is then passed between rolls whereby the rubber, aluminum or other powder, and tin-foil are forced into intimate contact. As the material passes from these rolls it is reeled upon a drum being compacted as it is rolled by means of a weighted idler roller bearing thereon.

The material when so rolled is transferred to the vulcanizing chamber and subjected to any desired form of vulcanization. Any of the various media ordinarily used in vulcanization may be employed. It has been found that good results may be obtained by the use of live steam. When sufficient vulcanization has taken place the material is removed from the chamber and unwound from the drum and the metal-foil is then stripped off. The resultant sheets of material comprise a smooth superficial pigment layer embedded in a glossy surface of vulcanized rubber, the ratio of pigment to rubber at the surface being large compared with other portions of the sheet. In the preferred form the portion below the surface is substantially unpigmented.

The process outlined and the products produced thereby have been found to achieve in general the objects of the invention heretofore set forth. The process may be carried on with long sheets of material and the amount of pigment employed for the covering of the rubber surface is relatively small compared with the amount required in other processes for producing a similar color. .044 ounce of aluminum powder per square yard of material have been found to produce a brilliant metallic-like surface. The product possesses the strength, flexibility, and the lightness of ordinary uncolored rubber. Its specific gravity is substantially unaltered. If fabric is incorporated with the material the bond formed is substantially as strong as that with uncolored rubber. The light reflecting qualities and in general the desirable physical and chemical properties of the aluminum pigment are substantially uninjured by the process of incorporation. The surface of the material is lustrous, ornamental, and possesses a smoothness such that it finds ready application in the construction of aeroplane wings, boats, pontoons, etc. The material becomes practically invisible against the landscape at long distances.

It will be observed that although aluminum powder has been specifically mentioned as the preferred pigment that other metallic and non-metallic pigments may be used, for example a white or cream-colored surface may be provided by admixture of a suitable white pigment and various other colors may be produced in a similar manner. It will further be noted that although tin-foil has been set forth as the preferred material in connection with vulcanization, other suitable sheet materials may be employed.

As many apparently widely different embodiments of this invention may be made without departing from the spirit thereof it is to be understood that I do not intend to limit myself to the specific embodiment herein set forth, except as indicated in the appended claims.

Having thus described my invention what I claim and desire to protect by Letters Patent is:

1. A process of the kind described, which comprises applying a pigment layer to a raw rubber surface without incorporation in the mass, the mass containing a vulcanizing agent, placing a metal-foil layer over the pigment layer and vulcanizing the so-assembled material thereby embedding the pigment in the rubber surface and providing a smoth lustrous appearance therefor.

2. A process of the kind described, which comprises applying to a vulcanizable raw rubber surface without incorporation in the mass, the mass containing a vulcanizing agent, a layer containing a pigment and chemically unitable to said surface by vulcanization thereof, placing a metal-foil layer over the pigment layer, and vulcanizing the so-assembled material.

3. A process of the kind described, which comprises applying a dry comminuted pigment to a raw rubber surface without incorporation in the mass, the mass containing a vulcanizing agent, placing a confining surface over the pigment and embedding the pigment in the surface by vulcanizing the material.

4. A process of the kind described, which comprises applying a dry comminuted pigment to a raw rubber surface without incorporation in the mass, the mass containing a vulcanizing agent, placing a metal-foil layer over the pigment, and embedding the pigment in the surface by vulcanizing the material.

5. The method of producing superficially colored hard rubber sheet which comprises applying to the unvulcanized sheeted stock a coating of dry comminuted pigment, superposing on said coating a sheet of metal, superposing said material and the metal in successive layers to form a compact mass and finally subjecting the mass to a vulcanizing heat whereby said dry pigment is bound by and inseparably united with the surface of the vulcanized rubber.

6. The method of producing superficially colored hard rubber sheet which comprises applying to the unvulcanized sheeted stock a coating of dry comminuted pigment, superposing on said coating a sheet of metal-foil, reeling said material with the metal-foil into a compact roll and finally subjecting the roll to a vulcanizing heat whereby said dry pigment is bound by and inseparably united with the surface of the vulcanized rubber.

7. A sheet of material comprising a layer of vulcanized rubber prepared from solid rubber and a smooth glossy pigment layer embedded therein, the ratio of pigment to rubber at the surface of the sheet being large compared with other portions of the sheet.

8. A sheet of material comprising a layer of vulcanized rubber prepared from solid rubber and a smooth glossy metallic pigment layer embedded therein, the ratio of pigment to rubber at the surface of the sheet being large compared with other portions of the sheet.

9. A sheet of material comprising a layer of vulcanized rubber prepared from solid rubber and a smooth superficial layer of aluminum powder embedded therein.

10. A process of the kind described, which comprises applying a sheet of thin metal to rubber having a non-adhesive layer on the surface thereof, rolling the metal and rubber together and embedding the layer in the rubber by vulcanizing the rubber so rolled.

11. A process of the kind described, which comprises applying a layer of powdered material to a rubber surface, placing a sheet of thin metal thereover, rolling the metal and rubber together and embedding the layer in the rubber by vulcanizing the rubber so rolled.

Signed at New York, in the county and State of New York, this 29 day of November, 1916.

WILLIS A. GIBBONS.